(12) United States Patent
Shields, II (10) Patent No.: US 6,439,444 B1
(45) Date of Patent: Aug. 27, 2002

(54) CANTILEVER CARRYING APPARATUS

(76) Inventor: Levi E. Shields, II, R.R. #3, Box 1424, Fairview Rd., Linton, IN (US) 47441

( * ) Notice: Subject to any disclaimer, the term of this patent is extended or adjusted under 35 U.S.C. 154(b) by 0 days.

(21) Appl. No.: 09/689,073

(22) Filed: Oct. 12, 2000

(51) Int. Cl.$^7$ ................................................. B60R 9/06
(52) U.S. Cl. ...................... 224/280; 224/410; 224/518; 224/525; 224/526
(58) Field of Search ................................. 224/280, 282, 224/492, 502, 505, 518–521, 511, 513, 522–527, 529, 410

(56) References Cited

U.S. PATENT DOCUMENTS

| | | | |
|---|---|---|---|
| 1,865,365 A | | 6/1932 | Foote |
| 2,442,889 A | | 6/1948 | Deal |
| 2,464,224 A | | 3/1949 | Grabert |
| 2,551,901 A | | 5/1951 | Richardson |
| 2,618,509 A | | 11/1952 | Carlson |
| 2,660,452 A | | 11/1953 | Johnson, Jr. |
| 3,650,443 A | * | 3/1972 | Haskett et al. |
| 3,913,811 A | * | 10/1975 | Spencer |
| 4,596,347 A | | 6/1986 | Hite |
| 4,744,590 A | * | 5/1988 | Chesney |
| 5,018,651 A | * | 5/1991 | Hull et al. |
| 5,344,175 A | * | 9/1994 | Speer |
| 5,360,259 A | * | 11/1994 | Lemberger ................. 224/280 |
| 5,427,289 A | * | 6/1995 | Ostor |
| 5,433,357 A | | 7/1995 | Alliff |
| 5,586,702 A | | 12/1996 | Sadler |
| 5,647,621 A | * | 7/1997 | McClellan |
| 6,039,228 A | * | 3/2000 | Stein et al. |

* cited by examiner

*Primary Examiner*—Gregory M. Vidovich
(74) *Attorney, Agent, or Firm*—Brinks Hofer Gilson & Lione (57) ABSTRACT

A wheel-less carrying apparatus for use in conjunction with a self-propelled utility vehicle includes a frame that supports a removable load carrying body. The frame has a pair of spaced longitudinal beams and at least two lateral ribs secured to the longitudinal beams, the rib nearest the distal ends of the beams including at least one portion having a circular cross-section. The removable load carrying body has a continuous surface surrounded by an upwardly extending perimeter. A downwardly extending coupling member fixed to the body removably and pivotally engages the rib nearest the distal ends of the beams so that the body can be tilted with respect to the frame. Downward flanges along each side of the body for engage ends of the lateral ribs of the frame to provide lateral stability for the body.

25 Claims, 9 Drawing Sheets

CANTILEVER CARRYING APPARATUS

BACKGROUND OF THE INVENTION

1. Field of the Invention

This invention relates generally to carrying devices for use in conjunction with garden tractors and other similar moving vehicles. In particular, this invention relates to a wheel-less carrying apparatus coupled to a rear portion of such a vehicle and extending rearwardly as a cantilever.

2. Description of the Prior Art

Farmer, gardeners, landscaping professionals and homeowners have long relied upon self-propelled vehicles to provide powered locomotion to aid in farming and landscaping activities. Traditionally, the vehicle of choice for farmers and gardeners has been the farm or garden tractor. However, in recent years, all-terrain vehicles with their lower cost and great flexibility have seen increased use in this role. Also, self propelled zero-turn radius vehicles (ZTR's) commonly used in lawn care have also seen some use in this roll. In this application the term self-propelled utility vehicle will be used to encompass the group comprising all-terrain vehicles, garden tractors, ZTR's and small farm tractors To ensure maximum flexibility such self-propelled utility vehicles are often designed generically without task specific implements. Thus to enable the self-propelled utility vehicles to engage in particular activities, it is necessary for the user to adapt the vehicle for the task at hand. Typically this has been accomplished through the use of separable implements that are coupled to the self-propelled utility vehicle to permit the vehicle to perform a chosen task. These implements can include devices such as trailers, mowers, plows, etc. To facilitate the attachment of implements to such vehicles, the self-propelled utility vehicles feature various mountings to permit the user to rapidly but temporarily connect and disconnect various implements to the vehicle.

One particularly important task that these vehicles are often asked to perform is to transport heavy and/or large loads from one location to another location. Because tractors and all-terrain vehicles do not typically have any meaningful on-board storage capacity, the use of carrying attachments in conjunction with such vehicles is required. The most common carrying apparatus is the wheeled trailer, cart or wagon. The wheeled cart, in its most basic form simply consists of four elements, a carrying platform, a pair of wheels for engaging the ground, an axle positioned between the wheels and fixed to the platform, and a hitch for attaching the cart to a vehicle.

Another common carrying apparatus is the sled. This device, typically favored in cold weather climates, consists of a carrying platforms to which two or more rails are attached. The rails are used to slidably engage the ground and to support the platform. A hitch is also provided to attach the sled to the vehicle to permit it to be moved by power transportation. The cart, the wagon and the sled are ground supported devices. Much of the load carried by these devices is transmitted directly to the ground through the cart or wagon wheels or through the sled rails. Each of these devices is a towed device that can easily complicate the operation of the self-propelled utility vehicle. Such complications can include increased turning radius and the potential for jack-knifing. In addition, such towed devices do not necessarily follow the pathway taken by the self-propelled utility vehicle and can easily deviate from the anticipated path of travel, resulting in damage to crops and, potentially, damage to the towed device and/or its contents. Such towed devices are particularly difficult for the occasional user to back up.

Accordingly, it is an objective of this invention to provide apparatus for use in conjunction with a self-propelled utility vehicle that provides an elevated load carrying platform, that is not a towed device. It is a further objective of this invention to provide such a platform that is quickly and easily coupled to and disengaged from a self-propelled utility vehicle preferable without the aid of any tools. It is yet another objective that the elevated load carrying platform be quickly and easily converted to various purposes. It is still another objective to provide an elevated load carrying platform that helps to protects the self-propelled utility vehicle from damage and that provides a flexibly elevated support for the carrying apparatus. It is a further objective of this invention to provide a wheel-less carrying apparatus that quickly and effectively attaches to a vehicle without substantially impairing the operation of the combined carrying apparatus/vehicle and that reduces the amount of wear on the draw-bar, frame, and tractor mountings.

Any load carrying device must have adequate flexibility in its function to accommodate the various types of loads that the user will encounter. Accordingly, a load carrying device must have features that permit the user to conform the load carrying device to the type of load being carried. Some loads require a substantially continuous platform surface to adequately support the load. Still other loads, such as loose materials, must be contained within a shaped perimeter, while other discrete loads or oversized loads are ill suited for transport using a shaped perimeter.

Accordingly, it is an object of this invention to provide a load carrying device that permits the user to define the characteristics of the load carrying devices and to tailor the characteristics of this device to best match the requirements of the load. Finally, it is an object of this invention to provide a load carrying device with a dumping feature to permit the user to transport loose materials and to unload these loose materials with a simple dumping action. Such dumping features are not unknown in the prior art, however, prior art dumping devices are often complicated devices that make the load carrying device more difficult to install and use, and further make the load carrying device heavier and more expensive. Thus, it is an object of this invention to provide a load carrying device that provides a low-cost, light-weight dumping mechanism that easy to install and remove from the self-propelled utility vehicle.

SUMMARY OF THE INVENTION

The present invention provides a wheel-less carrying apparatus for use in conjunction with a self-propelled utility vehicle having a rearwardly projecting extension including at least one opening for receiving a pin and having lateral extensions on either side of the rearwardly projecting extension. The rearwardly projecting extension generally takes the form of the conventional trailer hitch commonly found on such vehicles. While the lateral extensions are typically formed by an axle housing of the self-propelled utility vehicle, other lateral structures could be employed for the same purpose.

The wheel-less carrying apparatus of the present invention comprises a frame having a pair of spaced longitudinal beams, with each beam having a proximate and a distal end. The frame includes a brace fixed between the beams near the proximate ends of the beams, the brace including at least one pin adapted to be received in the opening of the rearwardly projecting extension of the self-propelled utility vehicle. The brace preferably also includes a lateral stabilizer that can take the form of at least one additional projecting element to engage an additional surface of the rearwardly projecting extension of the self-propelled utility vehicle. The proximal ends of the beams extend forwardly from the brace a distance sufficient to upwardly engage the lateral extensions on either side of the rearwardly projecting extension of the self propelled utility vehicle to support the frame in cantilever fashion. The frame also includes at least two lateral ribs, each rib secured to the beams in spaced relation to each other between the cantilever brace and the distal ends of the beams. An additional lateral rib is secured adjacent the distal ends of the beams. At least portions of the additional lateral rib are adapted to pivotally receive an additional load supporting body.

The wheel-less carrying apparatus of the present invention also comprises an additional load carrying body that includes a continuous load supporting surface. At least one downwardly extending coupling member is fixed to the load supporting body for removable pivoting engagement with the additional lateral rib at the distal end of the frame so that the continuous load supporting surface can be tilted with respect to the frame by pivotal motion with respect to the additional lateral rib. Downward extending flanges are provided along each side of the load carrying body for engaging ends of the lateral ribs of the frame to provide lateral stability of the load carrying body with respect to the frame. A bracket preferably extends downwardly from a lower surface of the load carrying body to engage a distal surface of either one of the lateral ribs or the rearwardly projecting extension of the self-propelled utility vehicle to inhibit longitudinal movement of the continuous load supporting surface with respect to the frame. An upstanding perimeter is preferably secured to the continuous load supporting surface to permit transport of loose materials. The rearward portion of the upstanding perimeter is preferably releasable to permit dumping of any load by a pivoting action of the continuous load supporting surface relative to the additional lateral rib at the distal end of the frame.

The wheel-less carrying apparatus of the present invention is easily installed and removed from the self-propelled utility vehicle. Importantly, the frame of the present invention is separable from the load carrying body. Thus, the user need only contend with handling the frame and not the combined frame and load carrying body. The frame, without the load carrying body, is of a space frame construction which does not block the user's ability to see the various surfaces involved in the installation of the apparatus. The frame is also easily maneuvered as its construction provides a number of surfaces that can be used as convenient hand holds and further permits the user to reach through the ribs and beams of the frame to obtain better access the surfaces used during installation. The light weight construction of the present invention greatly simplifies the process of installing the frame allowing the frame to be installed quickly and efficiently by one person.

The load carrying body of the present invention is likewise easily attached to and removed from the frame. The coupling member that couples the load carrying body to the frame is designed for slip engagement and disengagement, which is easily achieved by one person handling the load carrying body. The downward flanges on the load carrying body automatically laterally locate and stabilize it during transport. Dumping is easily achieved by simply releasing the rearward portion of the upstanding perimeter and lifting the front edge of the load carrying body. During a dumping operation, the load carrying body easily pivots about the distal most lateral rib of the frame without risk of becoming disconnected from the frame.

With the wheel-less carrying apparatus of the present invention installed on a self-propelled utility vehicle, the driving characteristics of the vehicle remain substantially unchanged. The vehicle is easily maneuvered, even in when being backed up, with no risk of jack-knifing. Thus, both the installation and operation of the present invention makes it suitable for use by the occasional user. These and other features and advantages of the present invention will become apparent from the following description of a preferred embodiment of the present invention that illustrated in the accompanying drawings.

DESCRIPTION OF THE PREFERRED EMBODIMENTS

Figure 1:
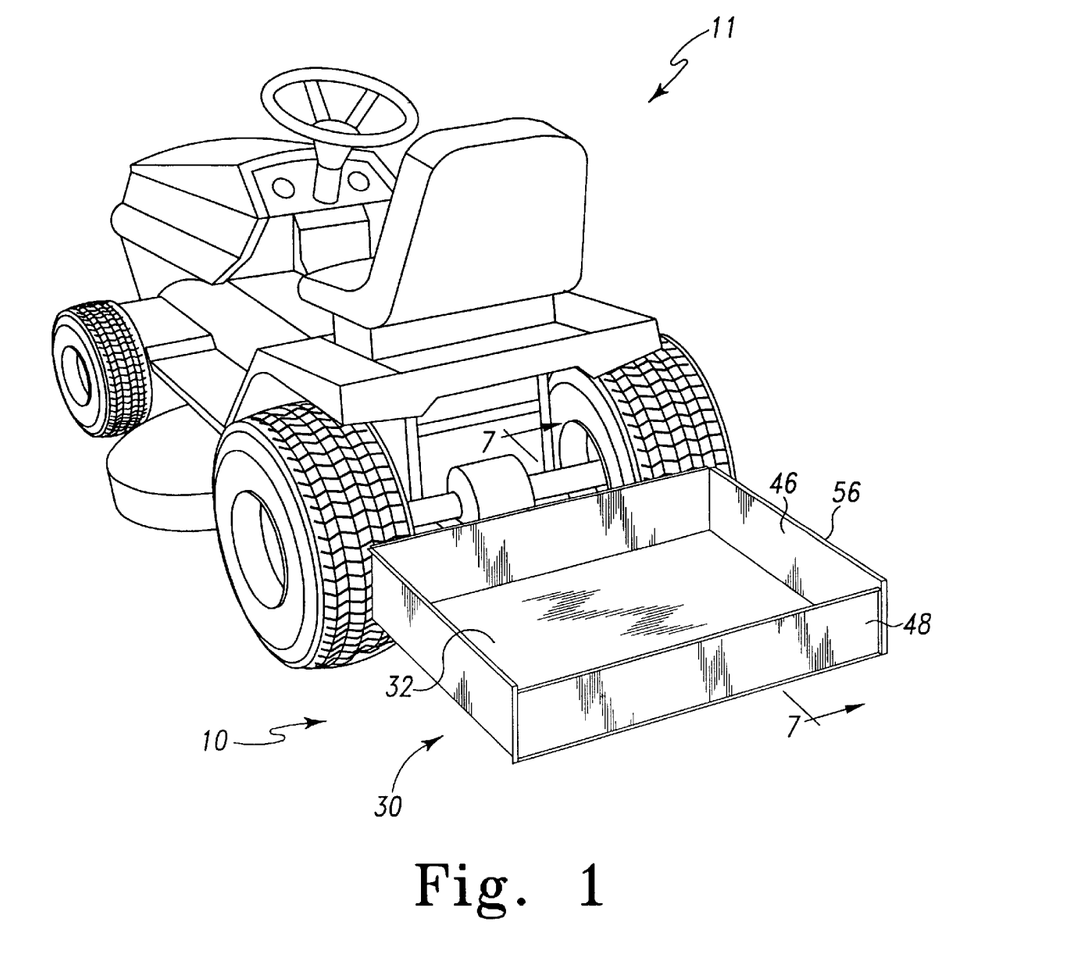
FIG. 1 is an oblique view of a wheel-less carrying apparatus of the present invention coupled to a typical self-propelled utility vehicle.
Figure 2:
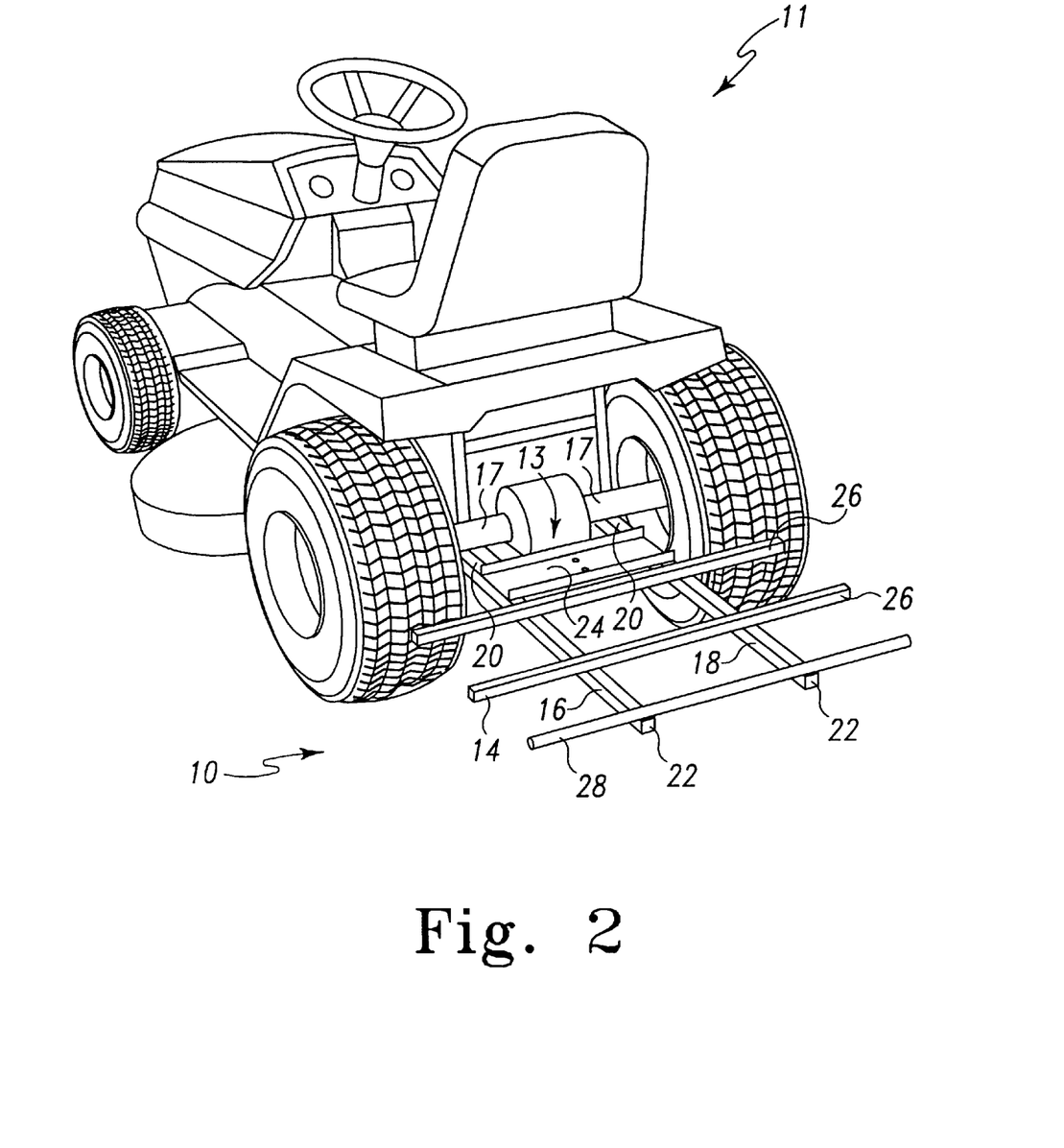
FIG. 2 is an oblique view of a frame of a wheel-less carrying apparatus of the present invention coupled to a typical self-propelled utility vehicle.
Figure 3:
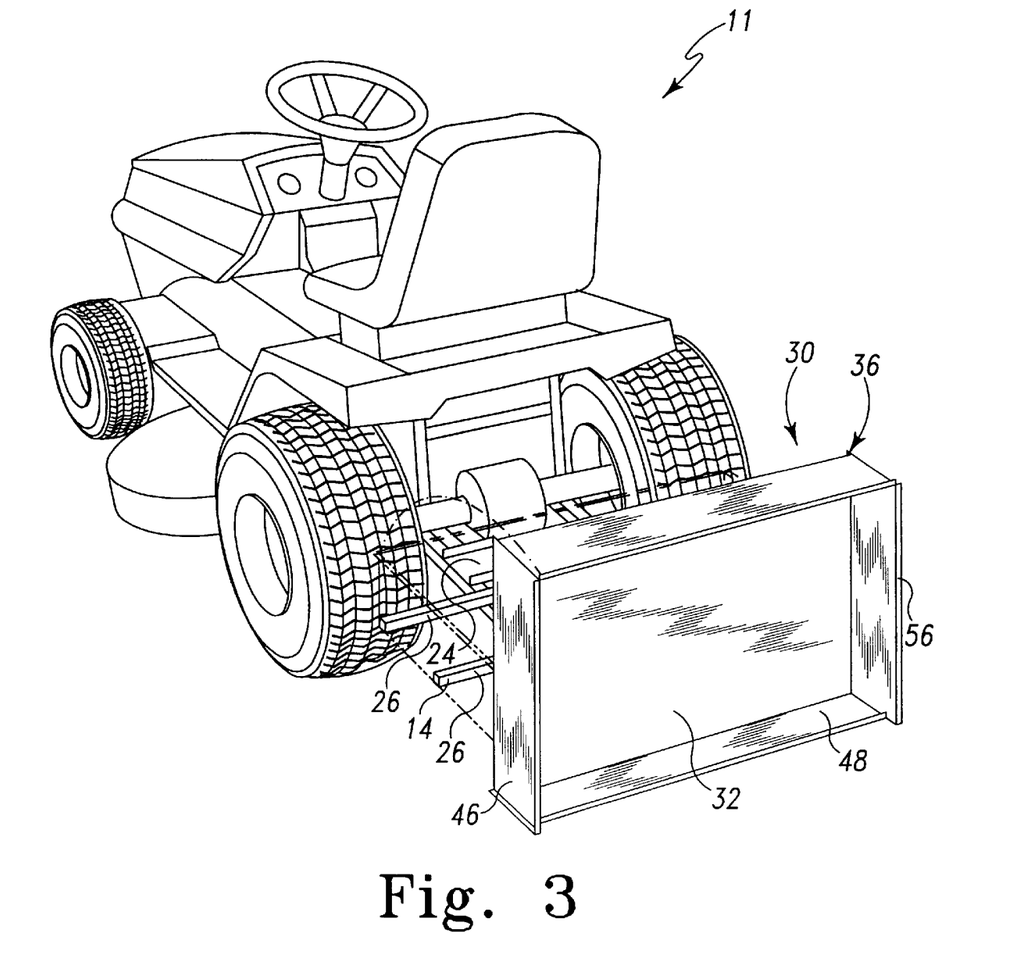
FIG. 3 is view similar to FIG. 1 with the load-carrying body pivoted from the position of FIG. 1, shown in phantom, to a perpendicular position with respect to the frame.

A wheel-less carrying apparatus 10 of the present invention is illustrated in FIGS. 1–3 in conjunction with a typical self-propelled utility vehicle 11. Additional details of the structure of preferred embodiments of the invention are shown in FIGS. 4–7. The self-propelled utility vehicle 11 has a rearwardly projecting extension 13, such as a conventional trailer hitch, that includes at least one opening 15. The opening 15 can be that generally provided on such extensions for receiving a trailer towing ball. The self-propelled utility vehicle 11 includes lateral extensions 17 on either side of the rearwardly projecting extension 13. While the lateral extensions 17 are typically formed by an axle housing of the self-propelled utility vehicle 11, other lateral structures could be employed for the same purpose.

The carrying apparatus 10 comprises a frame 14 having a pair of spaced longitudinal beams 16 and 18. Each of the beams 16, 18 have a proximal end 20 and a distal end 22. The frame 14 also includes a brace 24 fixed between the beams 1 6 and 18 near the proximal ends 20 thereof. The proximal ends 20 of the beams 1 6 and 18 extend forward from the brace 24 a distance sufficient to upwardly engage the lateral extensions 17 on either side of the rearwardly projecting extension 13 of the self propelled utility vehicle 11 to support the frame 14 in cantilever fashion.

Figure 4:
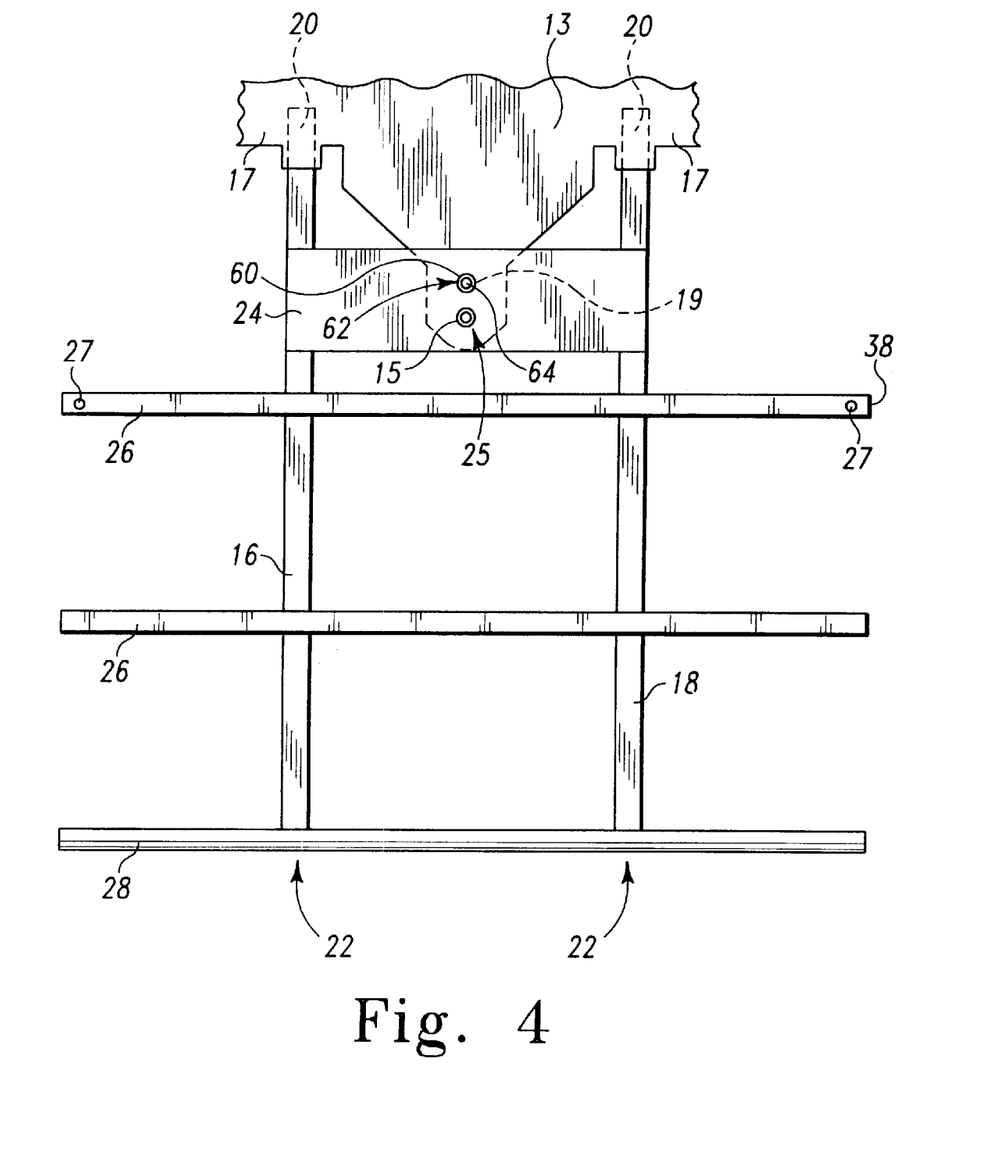
FIG. 4 is a plan view of a frame of the present invention coupled to a self-propelled utility vehicle and including a first lateral stabilizing structure.
Figure 5:
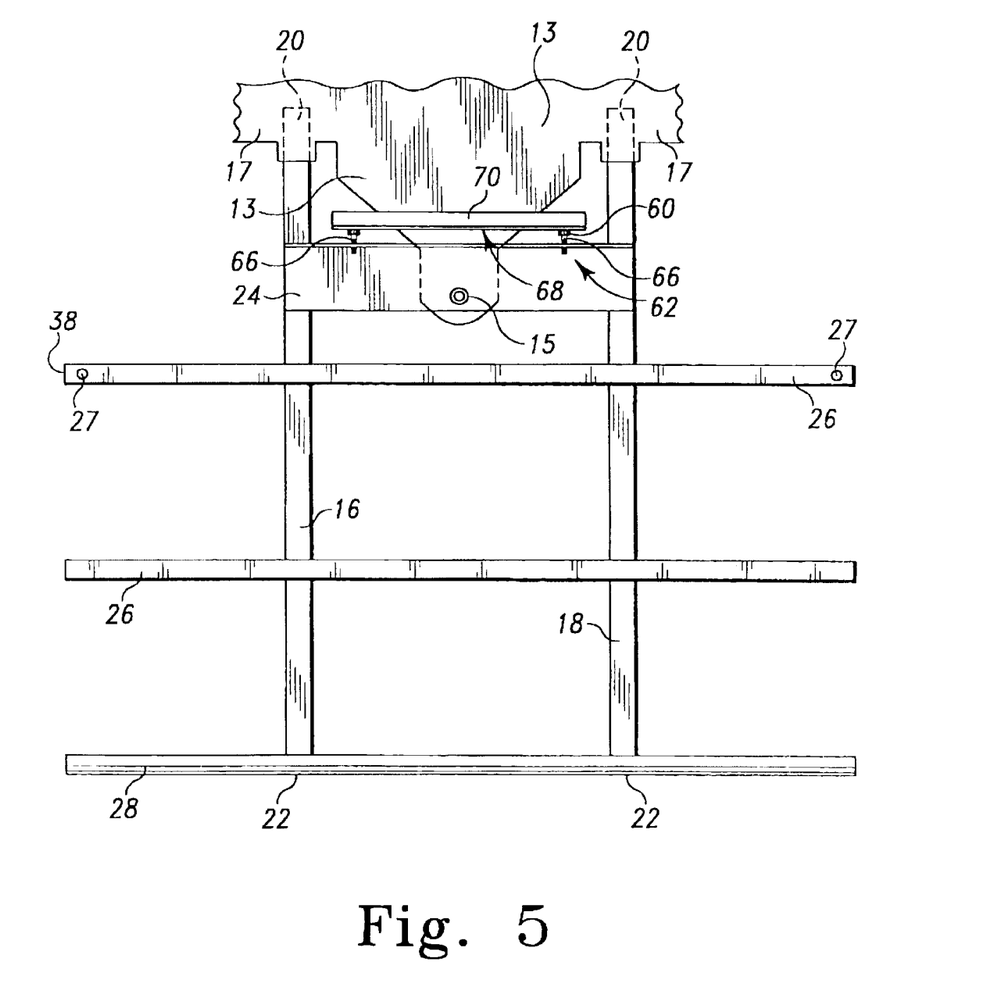
FIG. 5 is a plan view similar to FIG. 4 including a second lateral stabilizing structure.

The brace 24 includes at least one downwardly projecting pin 25 adapted to be received in the opening 15 of the rearwardly projecting extension 13 of the self-propelled utility vehicle 11 as shown in FIGS. 4 and 5. The brace 24 preferably also includes a lateral stabilizer 60. The lateral stabilizer 60 can take the form of at least one additional projecting element 62 to engage an additional surface 64 of the rearwardly projecting extension 13 of the self-propelled utility vehicle 11. In a first preferred embodiment the at least one additional projecting element 62 takes the form of a second downwardly projecting pin 64 fixed to a lower surface of the brace 24 and received in a second opening 19 in the rearwardly projecting extension 13 as shown in FIG. 4. In a second preferred embodiment the at least one additional projecting element 62 takes the form of a pair of studs 66 projecting forward from the brace 24 to contact a rearwardly facing surface 68 fixed to the rearwardly projecting extension 13. Surface 68 is illustrated in FIG. 5 to consist of a rearwardly facing surface of an angle member 70 but could consist of any fixed surface which would form a stable triangular formation with opening 15.

Figure 7:
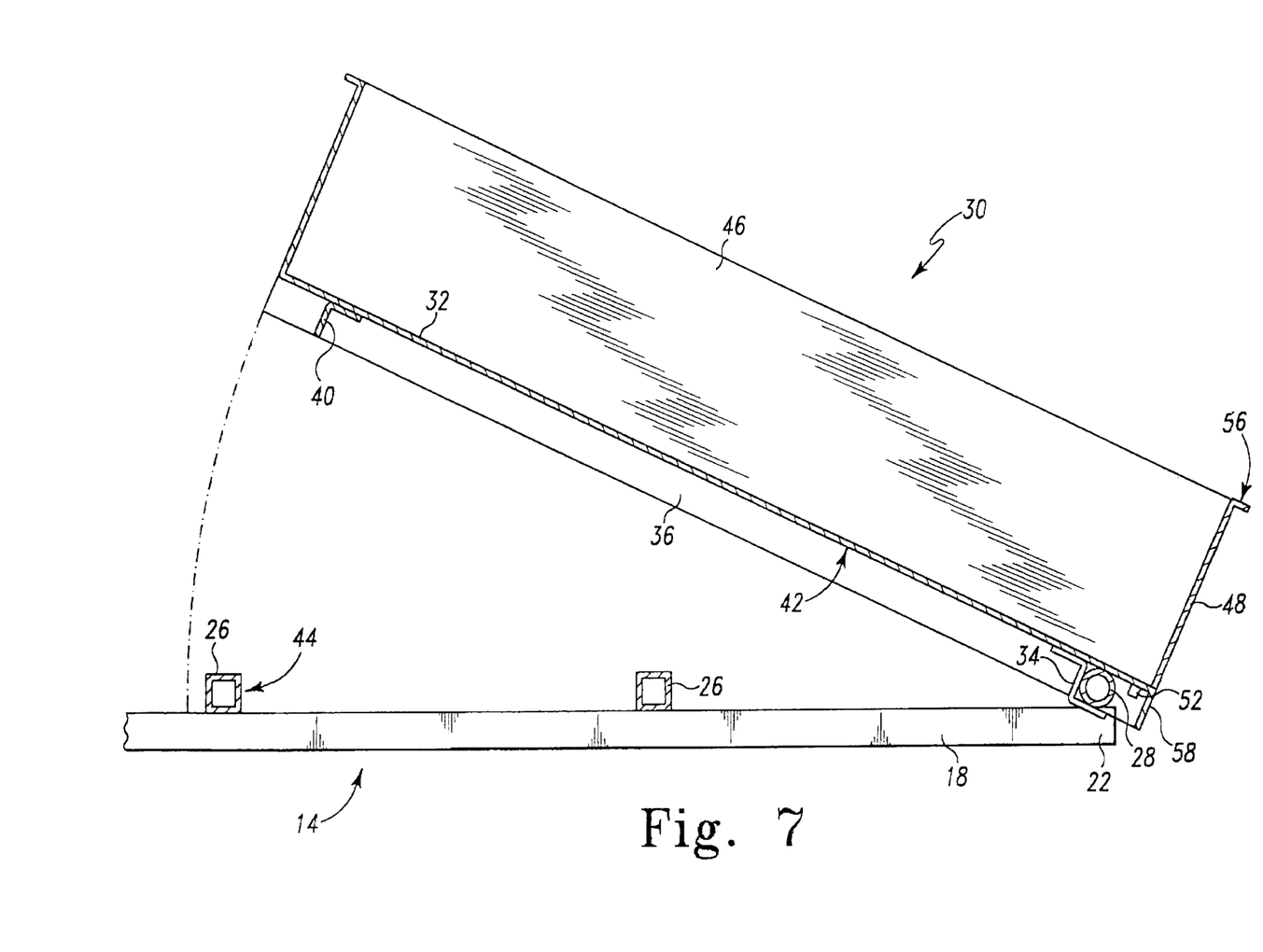
FIG. 7 is a sectional view of the present invention taken generally along line 7–7 of FIG. 1, but with the load-carrying body in a partially rotated position showing the coupling member and flanges that secure and locate the body relative to the frame.
Figure 8:
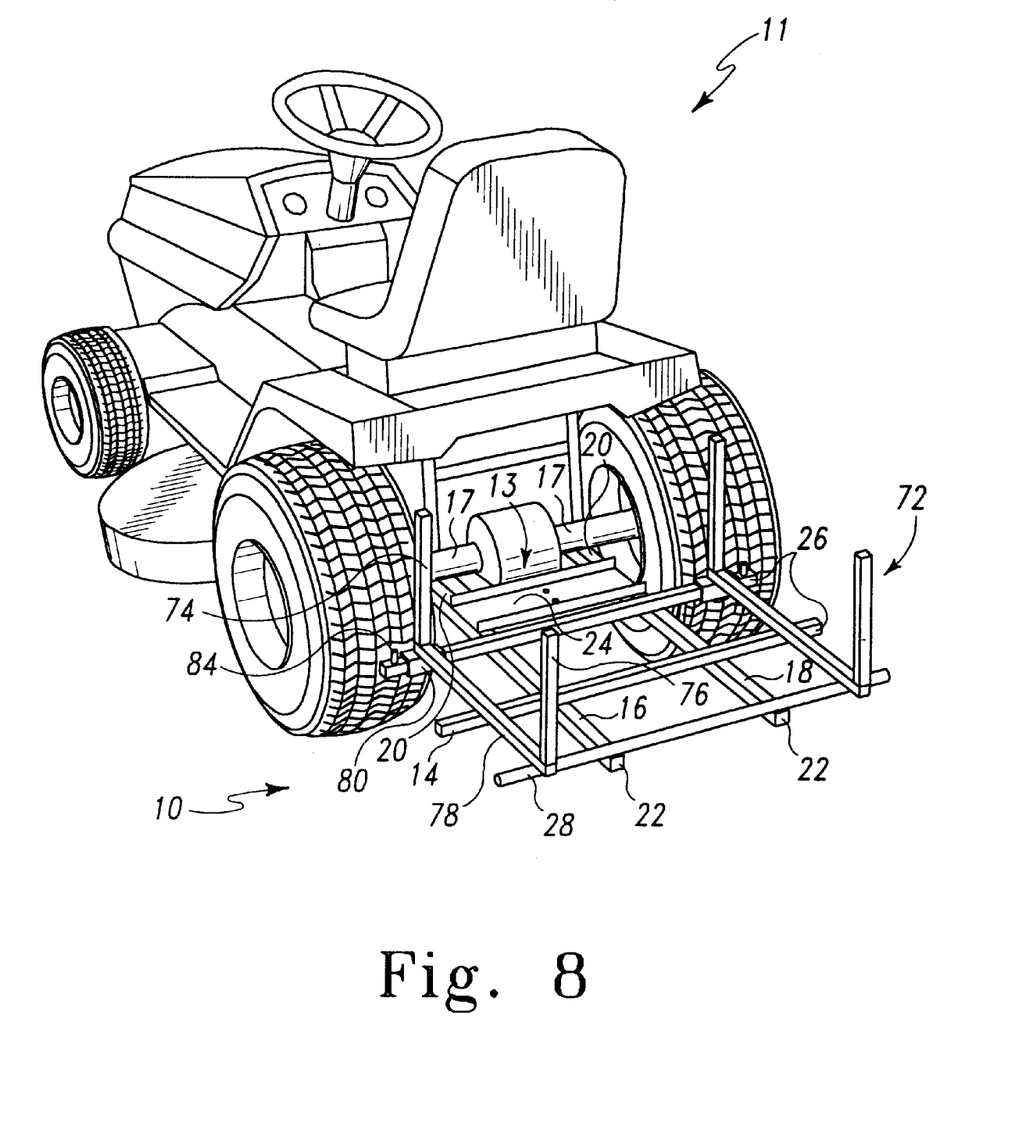
FIG. 8 is a perspective view similar to FIG. 2 with rack members added to the frame.

The frame 14 also includes at least two lateral ribs 26, each rib 26 being secured to the beams 1 6 and 1 8 in spaced relation to each other between the cantilever brace 24 and the distal ends 22 of the beams. At least one of the lateral ribs 26 includes an opening 27 adapted to receive a. retainer 84 as shown in FIG. 8 and discussed later. An additional lateral rib 28 is secured adjacent the distal ends 22 of the beams 16 and 18. At least a portion of the additional lateral rib 28 is adapted to pivotally receive an additional load supporting body 30 shown in FIGS. 1, 3, 6 and 7.

The load supporting body 30 includes a continuous load supporting surface 32. At least one downwardly extending coupling member 34 is fixed to the load supporting body 30 for removable pivoting engagement with the additional lateral rib 28 at the distal end 22 of the frame 14 so that the load supporting surface 32 can be tilted with respect to the frame 14 by pivotal motion with respect to the additional lateral rib 28 as shown in FIGS. 3 and 7. Downward extending flanges 36 are provided along each side of the load carrying body 30 for engaging ends 38 of the lateral ribs 26 and 28 of the frame 14 to provide lateral stability of the load carrying body 30 with respect to the frame 14. A bracket 40 extends downwardly from a lower surface 42 of the load carrying body 30 to engage a distal surface 44 of either one of the lateral ribs 26 or the rearwardly projecting extension 13 of the self-propelled utility vehicle 11 to inhibit longitudinal movement of the load supporting body 30 with respect to the frame 14.

Figure 6:
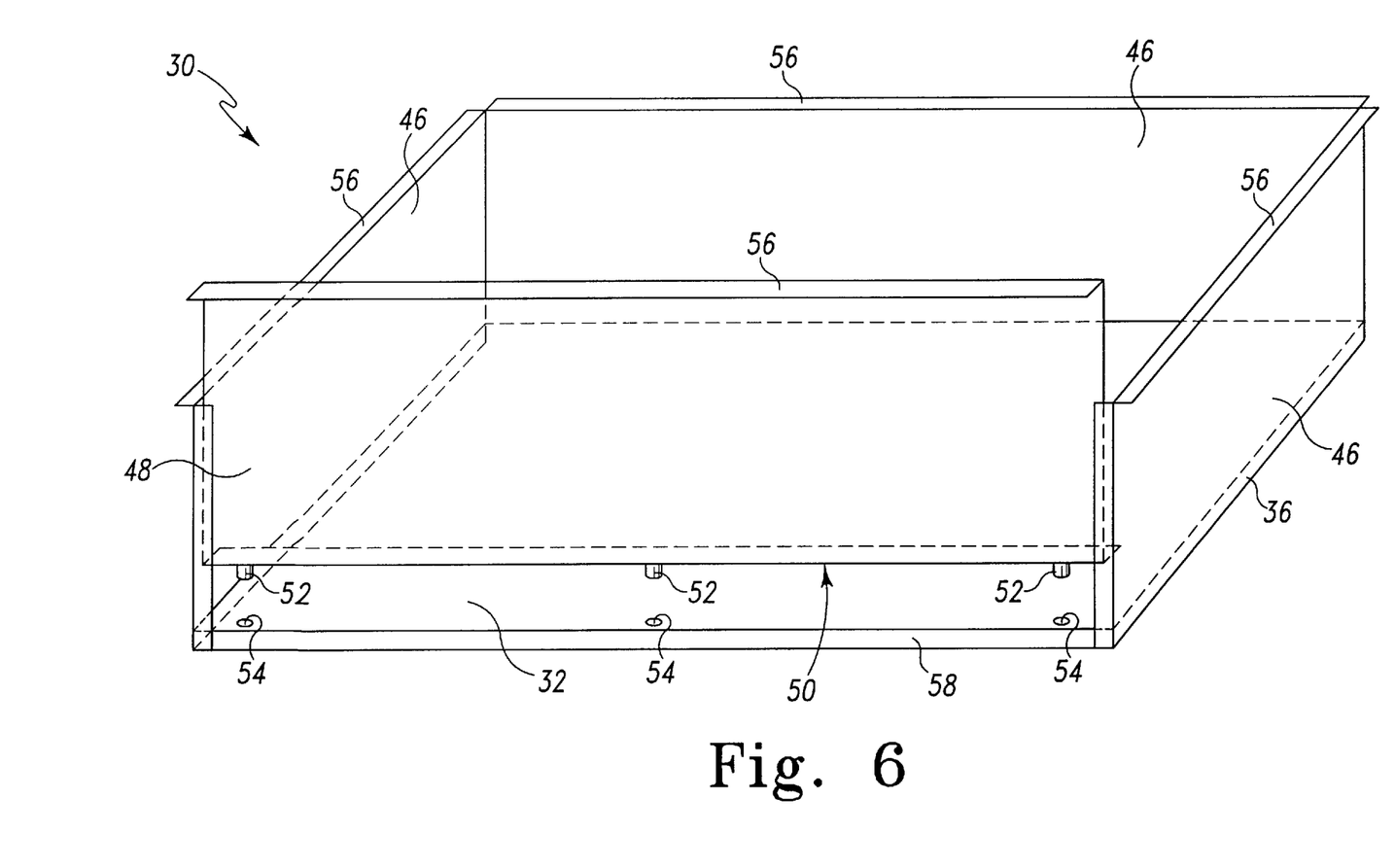
FIG. 6 is an oblique view of the rear portion of the load-carrying body showing the removable character of the tailgate and related retaining structure.

An upstanding perimeter 46 is preferably secured to the continuous load supporting surface 32 to permit transport of loose materials and otherwise contain loads. A rearward portion 48 of the upstanding perimeter 46 is preferably releasable, for example as shown in FIG. 6, to permit dumping of any load by a pivoting action of the load supporting body 30 relative to the additional lateral rib 28 at the distal end 22 of the frame 14. A lower edge 50 of the rearward portion 48 includes a plurality of locating pins 52 that are received in corresponding openings 54 in the load supporting surface 32 when the rearward portion 48 is lowered from the position shown in FIG. 6 so that a top edge 56 of the upstanding perimeter 46 is at a uniform height as shown in FIG. 1. The load supporting surface 32 includes along a rearward edge a downwardly turned lip 58. The lip 58 cooperates with coupling member 34 to define a slot for receiving at least a portion of rib 28 as shown in FIG. 7.

Figure 9:
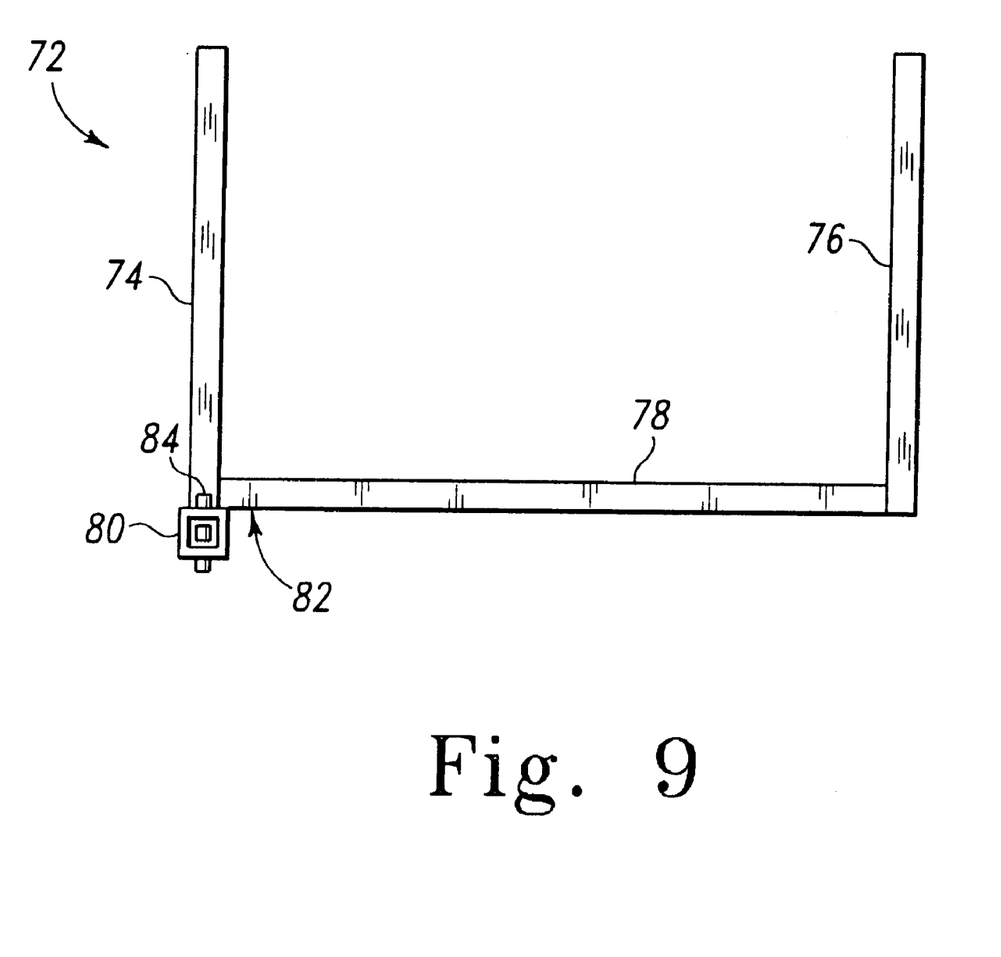
FIG. 9 is a side elevation view of a rack member used in combination with the frame as shown in FIG 8.

The frame 14 is easily adapted for carrying objects that are longer than the width of the load carrying body 30 by the addition of a pair of rack members 72 as shown in FIGS. 8 and 9. The rack members 72 consist essentially of front and rear vertical members 74 and 76 joined together by a horizontal longitudinal member 78. A short lateral horizontal tubular member 80 is fixed to the lower surface 82 of longitudinal member 78 directly below the front vertical member 74. The tubular member 80 is sized to be received over the front rib 26 with the longitudinal member 78 extending rearward therefrom to rest on top of the remaining ribs 26. A hitch pin or other similar retainer 84 situated at the lateral ends of front rib 26 can be employed to capture the tubular members 80 so that the rack members 72 will not vibrate off the frame 14. With such rack members 72 added to the frame 14, longer length loads such as fence posts, pipe, and landscape timbers, can easily be carried by the carrying apparatus 10.

The wheel-less carrying apparatus 10 of the present invention is easily installed and removed from the self-propelled utility vehicle 11. Since the frame 14 of the present invention is separable from the load carrying body 30, the user need only contend initially with handling the frame 14 when installing the apparatus 10 onto a self-propelled utility vehicle 11. The frame 14 is of an open frame construction which does not block the user's ability to see the various surfaces involved in the installation of the apparatus 10. The frame 14 is also easily maneuvered as its construction provides a number of surfaces that can be used as convenient hand holds. The construction also permits the user to reach between the ribs 26 and beams 16, 18 of the frame 14 to obtain better access the surfaces used during installation. The light weight construction of the frame 14 allows the frame to be installed quickly and efficiently by one person.

The load carrying body 30 of the present invention is likewise easily attached to and removed from the frame 14. The coupling member 34 that couples the load carrying body 30 to the rib 28 is designed for slip engagement and disengagement by way of the slot between coupling member 34 and the downwardly turned lip 58, which is easily achieved by one person handling the load carrying body 30. The downward flanges 36 on the load carrying body 30 automatically laterally locate and stabilize it during transport. Dumping is easily achieved by simply releasing the rearward portion 48 of the upstanding perimeter 46 and lifting the front edge of the load carrying body 30. During a dumping operation, the load carrying body 30 easily pivots about the distal most lateral rib 38 of the frame 14 without risk of becoming disconnected from the frame. Also, longer length loads such as fence posts, pipe, and landscape timbers, can easily be carried by the carrying apparatus 1 0 by the addition of rack members 72 to the frame 14 by telescoping tubular members 80 over the front rib 26. With the wheel-less carrying apparatus 1 0 of the present invention installed on a self-propelled utility vehicle 11, the driving characteristics of the vehicle remain substantially unchanged. Thus, both the installation and operation of the present invention makes it suitable for use by the occasional user.

Based on the forgoing description of preferred embodiments of the invention, other variations may become apparent to those skilled in the art, which are still within the scope and spirit of the invention as previously summarized and hereafter claimed.

What is claimed is:

1. A wheel-less carrying apparatus for use in conjunction with a self-propelled utility vehicle having a rearwardly projecting extension and having lateral extensions on either side of the rearwardly projecting extension, the wheel-less carrying apparatus comprising:
   a frame having a pair of spaced longitudinal beams, with each beam having a proximal end and a distal end;
   a brace fixed between the beams near the proximal ends of the beams for coupling to said rearwardly projecting extension;
   at least two lateral ribs secured to the longitudinal beams between the brace and the distal ends of the beams, the ribs being fixed in spaced relation to each other, the rib nearest the distal ends of the beams including at least one portion having a circular cross-section, the proximate end of each beam projecting forward from the brace by a distance sufficient to upwardly engage said lateral extensions to support the frame in cantilever fashion; and
   a load supporting body having a continuous surface adapted to cover an upper surface of the frame and at least one downwardly extending coupling member fixed to the load supporting body for removable pivoting engagement with said lateral rib nearest the distal ends of the beams so that the continuous load supporting surface can be tilted with respect to the frame.

2. The wheel-less carrying apparatus of claim 1 further comprising a first pin fixed to the brace for engagement in an opening of said rearwardly projecting extension of the self-propelled utility vehicle.

3. The wheel-less carrying apparatus of claim 1 further comprising at least one projecting element projecting from the brace to engage a surface of said rearwardly projecting extension to laterally stabilize the frame with respect to the self-propelled utility vehicle.

4. The wheel-less carrying apparatus of claim 3 wherein the at least one projecting element comprises a pair of forwardly projecting studs for adjustable contact with a confronting surface of said rearwardly projecting extension.

5. The wheel-less carrying apparatus of claim 3 wherein the at least one projecting element comprises a first pin and a second pin fixed to the brace for engagement in a first opening and a second opening of said rearwardly projecting extention of the self-propelled utility vehicle.

6. The wheel-less carrying apparatus of claim 1 further comprising downward extending flanges along each side of the load supporting body for engaging ends of said lateral ribs of the frame to provide lateral stability of the load supporting body with respect to the frame.

7. The wheel-less carrying apparatus of claim 1 further comprising a bracket extending downwardly from a lower surface of the load supporting body to engage a distal surface of one of said lateral ribs to inhibit longitudinal movement of the continuous surface with respect to the frame.

8. The wheel-less carrying apparatus of claim 1 wherein said load supporting body further comprises an upstanding perimeter secured to the continuous surface to permit transport of loose materials.

9. The wheel-less carrying apparatus of claim 8 wherein a rearward portion of the upstanding perimeter is releasable to permit dumping of any load by a pivoting action of the load supporting body relative to the distal end of the frame.

10. A wheel-less carrying apparatus for use in conjunction with a self-propelled utility vehicle having a rearwardly projecting extension and having lateral extensions on either side of the rearwardly projecting extension, the wheel-less carrying apparatus comprising:
   a frame having a pair of spaced longitudinal beams, with each beam having a proximal end and a distal end;
   a brace fixed between the beams near the proximal ends of the beams for coupling to said rearwardly projecting extension;
   at least two lateral ribs secured to the longitudinal beams between the brace and the distal ends of the beams, the ribs being fixed in spaced relation to each other, the rib nearest the distal ends of the beams including at least one portion having a circular cross-section;
   the proximate end of each beam projecting forward from the brace by a distance sufficient to upwardly engage said lateral extensions to support the frame in cantilever fashion; and
   at least one rack including a horizontal longitudinal member, front and rear vertical members fixed to the longitudinal member, and a lateral horizontal tubular member fixed to a lower surface of the longitudinal member, the tubular member being coupled to one of said lateral ribs.

11. A wheel-less carrying apparatus for use in conjunction with a self-propelled utility vehicle having a rearwardly projecting extension and having lateral extensions on either side of the rearwardly projecting extension, the wheel-less carrying apparatus comprising:
   a frame having a pair of spaced longitudinal beams, with each beam having a proximal end and a distal end;
   a brace fixed between the beams near the proximal ends of the beams, the brace having at least one pin fixed to the brace for engagement in an opening of said rearwardly projecting extension of the self-propelled utility vehicle for coupling the frame to the rearwardly projecting extension;
   at least two lateral ribs secured to the longitudinal beams between the brace and the distal ends of the beams, the ribs being fixed in spaced relation to each other, one of the ribs being fixed adjacent the distal ends of the beams, the proximate end of each beam projecting forward from the brace by a distance sufficient to upwardly engage said lateral extensions to support the frame in cantilever fashion;
   a load supporting body having a continuous surface; and
   at least one downwardly extending coupling member fixed to the load supporting body and removably pivotally engaged with the rib fixed adjacent the distal ends of the beams so that the continuous load supporting surface can be tilted with respect to the frame.

12. The wheel-less carrying apparatus of claim 11 wherein the rib adjacent the distal ends of the beams includes at least one cylindrical portion and wherein the at least one downwardly extending coupling member comprises a rearward extension defining a rearwardly facing opening slidably engaged onto the at least one cylindrical portion.

13. The wheel-less carrying apparatus of claim 11 further comprising downward extending flanges along each side of the load supporting body for engaging ends of said lateral ribs of the frame to provide lateral stability of the load carrying body with respect to the frame.

14. The wheel-less carrying apparatus of claim 11 further comprising a bracket extending downwardly from a lower surface of the load supporting body to engage a distal surface of one of said lateral ribs to inhibit longitudinal movement of the continuous load supporting surface with respect to the frame.

15. The wheel-less carrying apparatus of claim 11 wherein said load supporting body further comprises an upstanding perimeter is secured to the continuous surface to permit transport of loose materials.

16. The wheel-less carrying apparatus of claim 15 wherein a rearward portion of the upstanding perimeter is releasable to permit dumping of any load by a pivoting action of the load supporting body relative to the distal end of the frame.

17. The wheel-less carrying apparatus of claim 11 further comprising at least one projecting element projecting from the brace to engage a surface of said rearwardly projecting extension to laterally stabilize the frame with respect to the self-propelled utility vehicle.

18. The wheel-less carrying apparatus of claim 17 wherein the at least one projecting element comprises a pair of forwardly projecting studs for adjustable contact with a confronting surface of said rearwardly projecting extension.

19. The wheel-less carrying apparatus of claim 17 wherein the at least one projecting element comprises a first and second pin fixed to the brace for engagement in a first and second opening of said rearwardly projecting extension of the self-propelled utility vehicle.

20. A wheel-less carrying apparatus for use in conjunction with a self-propelled utility vehicle having a rearwardly projecting extension and having lateral extensions on either side of the rearwardly projecting extension, the wheel-less carrying apparatus comprising:

a frame having a pair of spaced longitudinal beams, with each beam having a proximal end and a distal end;

a brace fixed between the beams near the proximal ends of the beams, the brace having at least one pin fixed to the brace for engagement in an opening of said rearwardly projecting extension of the self-propelled utility vehicle for coupling the frame to the rearwardly projecting extension;

at least two lateral ribs secured to the longitudinal beams between the brace and the distal ends of the beams, the ribs being fixed in spaced relation to each other, one of the ribs being fixed adjacent the distal ends of the beams, the proximate end of each beam projecting forward from the brace by a distance sufficient to upwardly engage said lateral extensions to support the frame in cantilever fashion; and a pair of vertically extending racks, each rack comprising a horizontal longitudinal member, front and rear vertical members fixed to the longitudinal member, and a lateral horizontal tubular member fixed to a lower surface longitudinal member, the tubular member being coupled to one of the lateral ribs.

21. The wheel-less carrying apparatus of claim 20 further comprising a retainer situated at the lateral ends of the tubular member to which the horizontal tubular members of the racks are engaged.

22. A wheel-less carrying apparatus for use in conjunction with a self-propelled utility vehicle having a rearwardly projecting extension and having lateral extensions on either side of the rearwardly projecting extension, the wheel-less carrying apparatus comprising:

a frame having a pair of spaced longitudinal beams, with each beam having a proximal end and a distal end;

a brace fixed between the beams near the proximal ends of the beams, the brace having at least one pin fixed to the brace for engagement in an opening of said rearwardly projecting extension of the self-propelled utility vehicle for coupling the frame to the rearwardly projecting extension, and at least one projecting element projecting from the brace to engage a surface of said rearwardly projecting extension to laterally stabilize the frame with respect to the self-propelled utility vehicle;

at least two lateral ribs secured to the longitudinal beams between the brace and the distal ends of the beams, the ribs being fixed in spaced relation to each other, the rib nearest the distal ends of the beams including at least one portion having a circular cross-section, the proximate end of each beam projecting forward from the brace by a distance sufficient to upwardly engage said lateral extensions to support the frame in cantilever fashion;

a load carrying body having a continuous surface, and at least one downwardly extending coupling member fixed to the load carrying body for removable pivoting engagement with said at least one portion of the rib nearest the distal ends of the beams having a circular cross-section so that the continuous load supporting surface can be tilted with respect to the frame;

downward extending flanges along each side of the load carrying body for engaging ends of said lateral ribs of the frame to provide lateral stability of the load carrying body with respect to the frame;

a bracket extending downwardly from a lower surface of the load carrying body to engage a distal surface of one of said lateral ribs to inhibit longitudinal movement of the load carrying body when the continuous load supporting surface is contiguous to an upper surface of the frame; and an upstanding perimeter secured to the load carrying body to permit transport of loose materials, a rearward portion of the upstanding perimeter being releasable to permit dumping of any load by a pivoting action of the load carrying body relative to the distal end of the frame.

23. A load carrying body for use in conjunction with a generally planar frame adapted to be coupled to a self-propelled utility vehicle, the frame including a pair of spaced longitudinal beams, with each beam having a proximal end and a distal end and at least two lateral ribs secured to the longitudinal beams between the proximal ends and the distal ends of the beams, the ribs being fixed in spaced relation to each other, the load carrying body comprising:

a generally planar continuous load supporting member, at least one downwardly extending coupling member fixed to the load supporting member having a rearwardly facing opening for removable pivoting engagement with the rib nearest the distal ends of the beams so that the continuous load supporting member can be tilted with respect to the frame;

downward extending flanges along each side of the load supporting member for engaging ends of said lateral ribs of the frame to provide lateral stability of the load carrying body with respect to the frame; and a bracket extending downwardly from a lower surface of the load supporting member to engage a distal surface of another of said lateral ribs to inhibit longitudinal movement of the load carrying body when the continuous load supporting surface is contiguous to upper surfaces of the beams and ribs defining the frame.

24. The load carrying body of claim 23 further comprising an upstanding perimeter secured to the load supporting member to permit transport of loose materials, a rearward portion of the upstanding perimeter being releasable to permit dumping of any load by a pivoting action of the load carrying body relative to the distal end of the frame.

25. The load carrying body of claim 23 wherein the rearward portion comprises a generally planar member, a plurality of downwardly projecting pins fixed to a lower edge of the planar member and adapted to be received in openings located along a rearward edge of the load supporting surface.

* * * * *